US012746913B2

(12) United States Patent
Tsuchiya

(10) Patent No.: US 12,746,913 B2
(45) Date of Patent: Sep. 29, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Koichi Tsuchiya, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 18/829,300

(22) Filed: Sep. 10, 2024

(65) Prior Publication Data

US 2025/0187590 A1 Jun. 12, 2025

(30) Foreign Application Priority Data

Dec. 7, 2023 (JP) ................................ 2023-207242

(51) Int. Cl.
*B60W 30/09* (2012.01)
*B60W 30/085* (2012.01)
*B60W 30/095* (2012.01)

(52) U.S. Cl.
CPC ...... *B60W 30/085* (2013.01); *B60W 30/0953* (2013.01); *B60W 30/0956* (2013.01); (Continued)

(58) Field of Classification Search
CPC ........... B60W 30/085; B60W 30/0953; B60W 30/0956; B60W 2554/4044; B60W 2554/806; B60W 2540/225; B60W 2554/802; B60W 30/09; B60W 30/095; B60W 40/08; B60W 2420/403; B60W 2420/408
See application file for complete search history.

(56) References Cited

U.S. PATENT DOCUMENTS 9,105,190 B2 8/2015 Akiyama
9,393,960 B2 7/2016 Kodaira
(Continued)

FOREIGN PATENT DOCUMENTS

JP 2006-227905 A 8/2006
JP 2007-072632 A 3/2007
(Continued)

*Primary Examiner* — Ramya P Burgess
*Assistant Examiner* — Chanmin Park
(74) *Attorney, Agent, or Firm* — SoraIP, Inc.

(57) ABSTRACT

A vehicle control device can execute vehicle control related to driving assistance that reduces a possibility of a collision against a target when a predetermined collision condition is established, the target being present in a front side region that extends from a left obliquely front side to a right obliquely front side of the vehicle so as to include a front side of the vehicle, and the collision condition being established when the possibility of the collision is high. The vehicle control device includes a control unit configured to acquire first and second information when there is a possibility of a collision against an intersecting approaching target that is traveling from a direction intersecting a traveling direction of the vehicle so as to approach a course of the vehicle, and change ease of establishment of the collision condition based on the first and the second information.

5 Claims, 3 Drawing Sheets

(52) U.S. Cl.
CPC ............... *B60W 2554/4044* (2020.02); *B60W 2554/806* (2020.02)

(56) References Cited

U.S. PATENT DOCUMENTS

| | | | | |
|---|---|---|---|---|
| 9,483,945 | B2 | 11/2016 | Okita et al. | |
| 9,873,412 | B2 | 1/2018 | Moriizumi | |
| 10,793,147 | B2 | 10/2020 | Kaminade et al. | |
| 2006/0195241 | A1 | 8/2006 | Nakagoshi | |
| 2021/0061309 | A1 | 3/2021 | Kawanai | |
| 2021/0107521 | A1 | 4/2021 | Fujita et al. | |
| 2021/0107528 | A1 | 4/2021 | Fujita et al. | |
| 2021/0146956 | A1 | 5/2021 | Fujita et al. | |
| 2021/0146958 | A1 | 5/2021 | Tanaka et al. | |
| 2023/0192132 | A1* | 6/2023 | Oh | B60W 30/095 701/26 |
| 2023/0264663 | A1* | 8/2023 | Fukui | B60W 30/08 701/70 |

FOREIGN PATENT DOCUMENTS

| | | | |
|---|---|---|---|
| JP | 2010-079424 | A | 4/2010 |
| JP | 2022-176510 | A | 11/2022 |
| JP | 2023-122207 | A | 9/2023 |
| WO | 2007/029089 | A1 | 3/2007 |

* cited by examiner

| θ diff | Δt |
|---|---|
| θ 1 | t1 |
| θ 2 | t2 |
| ⋮ | ⋮ |
| θ k | tk |
| ⋮ | ⋮ |
| θ n | tn |

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-207242 filed on Dec. 7, 2023, incorporated herein by reference in its entirety.

BACKGROUND

1. Technical Field

The disclosure relates to a vehicle control device, a vehicle control method, and a storage medium.

2. Description of Related Art

In related art, a vehicle control device that is able to execute vehicle control related to driving assistance that reduces a possibility of a collision against a target is known. In the vehicle control, for example, when a target against which a vehicle is highly likely to collide is detected in front of the vehicle, braking force for avoiding the collision against the target is automatically applied to the vehicle. The vehicle control includes control for reducing a possibility of a collision by automatically applying the braking force (see, for example, Japanese Unexamined Patent Application Publication No. 2010-079424).

Further, in related art, a driver monitoring system that monitors a state of a driver of a vehicle and calls attention is known. The driver monitoring system is a system that detects a position and a direction of a face of the driver by performing image processing on a captured image captured by an in-vehicle camera and calls attention based on the detected information (see, for example, Japanese Unexamined Patent Application Publication No. 2006-227905).

SUMMARY

If vehicle control is executed, a collision of a vehicle against a target can be avoided, which improves traveling safety. On the other hand, if vehicle control is executed although a driver has recognized the target, the execution of the control is unnecessary actuation for the driver. For example, a case will be considered where a target is traveling from a direction intersecting a traveling direction of the vehicle so as to approach a course of the vehicle. In such a case, the vehicle control is executed although the driver has already recognized the target and tries to start driving operation (for example, brake operation) for avoiding a collision against the target shortly. This makes the driver feel that execution of the control is unnecessary. Note that in the following description, such a target will be referred to as an "intersecting approaching target".

Here, a technique is known in which a warning is issued to a driver when the driver monitoring system determines that the driver is in a state where the driver cannot perform driving operation, and vehicle control is performed when the state has continued for a predetermined period even after the warning. However, with the technique, unnecessary actuation of the vehicle control with respect to the intersecting approaching target cannot be prevented, and thus, there is room for improvement.

The present disclosure has been made to address the problem described above. In other words, one of objects of the present disclosure is to provide a technique capable of preventing unnecessary actuation of vehicle control with respect to an intersecting approaching target.

A vehicle control device according to the present disclosure (hereinafter, referred to as a "device of the present disclosure") is able to execute vehicle control related to driving assistance that reduces a possibility of a collision of a vehicle (V) against a target when a predetermined collision condition is established, the target being present in a front side region that extends from a left obliquely front side to a right obliquely front side of the vehicle so as to include a front side of the vehicle, and the collision condition being established when the possibility of the collision is high, the vehicle control device including a control unit configured to: acquire first information including a relative position of an intersecting approaching target (Va) with respect to the vehicle and second information including a direction of a face of a driver of the vehicle (S420) when there is a possibility of a collision against the intersecting approaching target (S415: Yes), the intersecting approaching target being a target traveling from a direction intersecting a traveling direction of the vehicle so as to approach a course of the vehicle; and change ease of establishment of the collision condition based on the first information and the second information (S435).

In the device of the present disclosure, when there is a possibility of a collision against the intersecting approaching target, ease of establishment of the collision condition of vehicle control (in other words, a start timing of vehicle control) is changed based on the first information and the second information. Here, the first information includes the relative position of the intersecting approaching target with respect to the vehicle, and the second information includes the direction of the face of the driver. Use of the first information and the second information enables estimation of a degree of a possibility that the driver has already recognized the intersecting approaching target. Thus, according to a configuration of the device of the present disclosure, the start timing of the vehicle control can be changed based on the "degree of the possibility that the driver has recognized the intersecting approaching target", which results in making it possible to prevent unnecessary actuation of the vehicle control with respect to the intersecting approaching target.

In one aspect of the present disclosure, the control unit is configured to:

- compute a difference (θdiff) between a direction from the vehicle toward the intersecting approaching target and the direction of the face of the driver based on the difference between the first information and the second information; and
- change the ease of establishment of the collision condition based on the difference.

In this configuration, the ease of establishment of the collision condition of the vehicle control (start timing of the vehicle control) is changed based on the direction from the vehicle toward the intersecting approaching target and the direction of the face of the driver. The driver recognizes the intersecting approaching target by turning his/her face in a direction in which the intersecting approaching target is present. Thus, the difference functions as a scale indicating "to what degree the driver turns his/her face in the direction in which the intersecting approaching target is present". Thus, according to this configuration, a "degree of the possibility that the driver has recognized the intersecting approaching target" can be determined with high accuracy, so that the start timing of the vehicle control can be appropriately changed. This results in making it possible to more appropriately prevent unnecessary actuation of the vehicle control with respect to the intersecting approaching target.

In one aspect of the present disclosure, the control unit is configured to make it more difficult for the collision condition to be established as the difference (θdiff) decreases.

In this configuration, establishment of the collision condition is made more difficult (in other words, the start timing of the vehicle control is delayed) as the difference decreases. The "difference decreases" means that the "driver turns his/her face in the direction in which the intersecting approaching target is present". This means that the possibility that the driver recognizes the intersecting approaching target becomes higher. According to this configuration, the start timing of the vehicle control becomes later as the possibility that the driver has recognized the intersecting approaching target becomes higher, so that it is possible to prevent unnecessary actuation of the vehicle control with respect to the intersecting approaching target more appropriately.

A vehicle control method of the present disclosure is able to execute vehicle control related to driving assistance that reduces a possibility of a collision of a vehicle (V) against a target when a predetermined collision condition is established, the target being present in a front side region that extends from a left obliquely front side to a right obliquely front side of the vehicle so as to include a front side of the vehicle, and the collision condition being established when the possibility of the collision is high, the vehicle control method including: acquiring first information including a relative position of an intersecting approaching target (Va) with respect to the vehicle and second information including a direction of a face of a driver of the vehicle (S420) when there is a possibility of a collision against the intersecting approaching target (S415: Yes), the intersecting approaching target being a target traveling from a direction intersecting a traveling direction of the vehicle so as to approach a course of the vehicle; and changing ease of establishment of the collision condition based on the first information and the second information (S435).

According to the vehicle control method, it is possible to appropriately prevent unnecessary actuation of the vehicle control with respect to the intersecting approaching target.

A storage medium of the present disclosure stores a vehicle control program that is able to execute vehicle control related to driving assistance that reduces a possibility of a collision of a vehicle (V) against a target when a predetermined collision condition is established, the target being present in a front side region that extends from a left obliquely front side to a right obliquely front side of the vehicle so as to include a front side of the vehicle, and the collision condition being established when the possibility of the collision is high, the vehicle control program causing a computer to execute: acquiring first information including a relative position of an intersecting approaching target (Va) with respect to the vehicle and second information including a direction of a face of a driver of the vehicle (S420) when there is a possibility of a collision against the intersecting approaching target (S415: Yes), the intersecting approaching target being a target traveling from a direction intersecting a traveling direction of the vehicle so as to approach a course of the vehicle; and changing ease of establishment of the collision condition based on the first information and the second information (S435).

According to the storage medium, it is possible to appropriately prevent unnecessary actuation of the vehicle control with respect to the intersecting approaching target.

While in the above description, reference numerals used in the embodiment are attached in brackets to components of the disclosure corresponding to the embodiment to facilitate understanding of the disclosure, the components of the disclosure are not limited to those specified by the reference numerals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration

Figure 1:
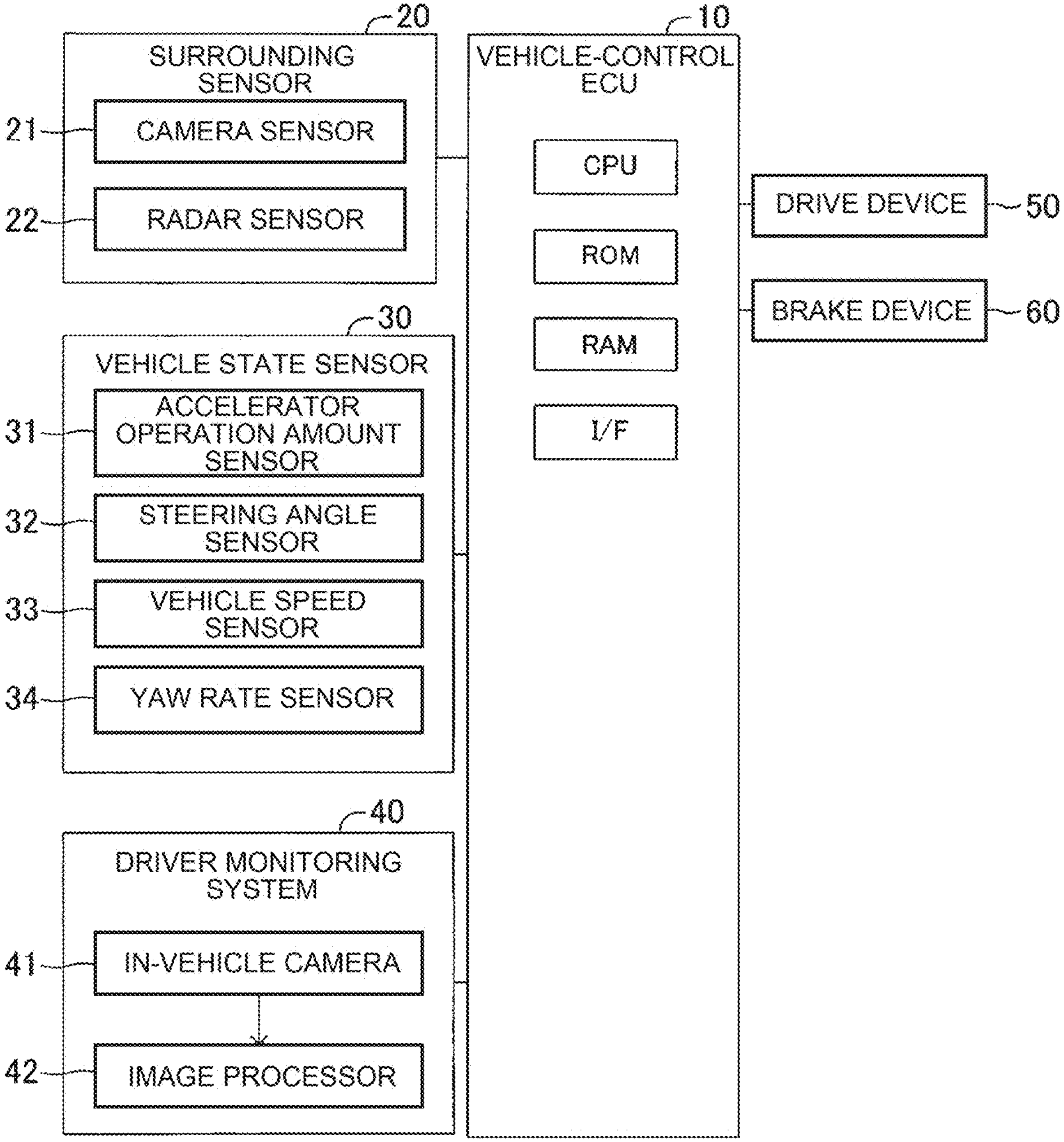
FIG. 1 is a schematic configuration diagram of a vehicle control device according to an embodiment of the present disclosure.

A vehicle control device (hereinafter, also referred to as a "present device") according to an embodiment of the present disclosure will be described below with reference to the drawings. The present device is mounted on a vehicle. As illustrated in FIG. 1, the present device includes a vehicle-control ECU 10, a surrounding sensor 20, a vehicle state sensor 30, a driver monitoring system 40, a drive device 50, and a brake device 60. Elements 20, 30, 40, 50 and 60 are connected to the vehicle-control ECU 10. The vehicle-control ECU 10 includes a microcomputer as a main part. The microcomputer includes a CPU, a ROM, a RAM, an interface (I/F), and the like, and implements various kinds of functions by the CPU executing instructions (programs, routines) stored in the ROM. The ROM and the RAM are one example of a storage medium. Hereinafter, a vehicle on which the present device is mounted will be referred to as an "own vehicle".

The vehicle-control ECU 10 is configured to acquire signals output by the sensors 20 and 30 and the system 40 every time a predetermined period has elapsed and control the devices 50 and 60 based on the acquired signals. Hereinafter, the vehicle-control ECU 10 will be also simply referred to as an "ECU 10".

The surrounding sensor 20 includes a camera sensor 21 and a radar sensor 22. The camera sensor 21 is installed on a back side of an inner mirror of the own vehicle. The camera sensor 21 captures an image of scenery in a front side region of the own vehicle (region extending from a left obliquely front side to a right obliquely front side of the own vehicle so as to include a front side of the own vehicle) and detects a three-dimensional object present in the region based on the captured image data. The three-dimensional object includes a moving object. The moving object is another vehicle, a bicycle, a pedestrian, or the like. When the three-dimensional object is detected, the camera sensor 21 computes a relative relationship (a relative position and a relative speed of the three-dimensional object with respect to the own vehicle) between the own vehicle and the three-dimensional object. Note that the camera sensor 21 may be configured to be able to discern a type of the three-dimensional object. Further, the three-dimensional object may include a stationary object. The stationary object is, for example, a traffic light, a road sign, and a structure (such as a guardrail, a curb and a center median).

Further, the camera sensor 21 detects compartment lines in front of the own vehicle based on the image data and computes a shape of a lane (region between adjacent two compartment lines) based on the detected compartment lines.

The radar sensor 22 is installed at each of right and left corner portions of a front end of the own vehicle. The radar sensor 22 irradiates a region around the own vehicle (more specifically, a range including the front side region) with a radio wave in a millimeter waveband. When a three-dimensional object is present within the irradiation range of the radio wave, the radar sensor 22 receives a reflected wave from the three-dimensional object. The radar sensor 22 computes a relative relationship between the own vehicle and the three-dimensional object based on an irradiation timing, a reception timing, and the like, of the radio wave. In other words, the radar sensor 22 detects a three-dimensional object present around the own vehicle.

The surrounding sensor 20 acquires information related to the three-dimensional object respectively obtained by the camera sensor 21 and the radar sensor 22 as surrounding information and outputs the information to the ECU 10. Note that the surrounding sensor 20 may include a LiDAR in place of or in addition to the camera sensor 21 and/or the radar sensor 22. In the following description, the three-dimensional object detected by the surrounding sensor 20 will be referred to as a "target".

The vehicle state sensor 30 includes an accelerator operation amount sensor 31, a steering angle sensor 32, a vehicle speed sensor 33, and a yaw rate sensor 34. The accelerator operation amount sensor 31 detects an operation amount (stroke amount) of an accelerator pedal. The steering angle sensor 32 detects a steering angle in accordance with steering operation (operation of a steering wheel) by a driver. The vehicle speed sensor 33 detects a speed (vehicle speed) of the own vehicle. The yaw rate sensor 34 detects a yaw rate of the own vehicle. In other words, the vehicle state sensor 30 detects a plurality of types of vehicle states in accordance with driving operation by the driver. The vehicle state sensor 30 acquires information related to the detected vehicle states as vehicle state information and outputs the information to the ECU 10.

The driver monitoring system 40 includes an in-vehicle camera 41, and an image processor 42. The in-vehicle camera 41 is a near-infrared CCD camera installed on a steering column cover (not illustrated). The in-vehicle camera 41 is able to capture an image of a predetermined range including a face of the driver every time a predetermined imaging period has elapsed. The image data captured by the in-vehicle camera 41 is transmitted to the image processor 42. The image processor 42 computes a direction of the face of the driver (for example, which of the right and the left with respect to an anterior-posterior axis of the own vehicle the driver faces to) and an angle (which will be described later) of the direction of the face by performing image processing on the image data using a well-known method. The driver monitoring system 40 acquires information including the computed direction of the face of the driver and angle of the direction of the face as driver information and outputs the information to the ECU 10. The driver information corresponds to one example of "second information".

The drive device 50 is a device for applying drive force for causing the own vehicle to travel, to a drive wheel. The ECU 10 controls the drive force to be applied to the drive wheel by controlling actuation of the drive device 50. Note that a type of the own vehicle is not particularly limited. For example, the own vehicle may be an engine vehicle, a hybrid electric vehicle (HEV), a plug-in hybrid electric vehicle (PHEV), a fuel cell electric vehicle (FCEV), a battery electric vehicle (BEV), or the like.

The brake device 60 is a device for applying braking force for braking the own vehicle, to the wheels. The ECU 10 controls the braking force to be applied to the wheels by controlling actuation of the brake device 60.

Details of Actuation

The ECU 10 is configured to be able to execute vehicle control related to driving assistance that reduces a possibility of a collision when a predetermined collision condition (condition that is established when the possibility of the collision against a target is high) is established for the target detected based on the surrounding information. In the present embodiment, the vehicle control means automatic braking control (that is, control for automatically applying braking force to the own vehicle). However, the vehicle control may include, for example, automatic steering control (control for automatically changing a steering angle of steering wheels of the own vehicle) in addition to or in place of the automatic braking control. Alternatively, the vehicle control may include other kinds of control.

When the vehicle control is executed, a collision of the own vehicle against the target can be avoided, which improves traveling safety. On the other hand, when the vehicle control is executed although the driver has recognized the target, the execution of the control becomes unnecessary actuation for the driver. One example where such a situation occurs includes a case where the target is an intersecting approaching target. The intersecting approaching target is a target that is traveling from a direction intersecting a traveling direction of the own vehicle so as to approach a course of the own vehicle. When a possibility that the driver has recognized the intersecting approaching target is high, execution of the vehicle control is preferably prevented.

Thus, in the present embodiment, the ECU 10 is configured to be able to determine a "degree of the possibility that the driver has recognized the intersecting approaching target" based on the surrounding information (strictly, intersecting approaching target information which will be described later) and the driver information and change a start timing of the vehicle control based on the degree. In other words, the collision condition is established when a "time to collision (TTC)" is equal to or less than a "predetermined time-to-collision threshold (TTCth)", but in related art, TTCth is a fixed value. In contrast, in the present embodiment, a variable time-to-collision threshold (TTCthv) that becomes smaller as the "degree of the possibility that the driver has recognized the intersecting approaching target" is higher is used instead of TTCth. According to this configuration, as the degree becomes higher, establishment of $TTC \leq TTCthv$ becomes more difficult, and the start timing of the vehicle control becomes later. Thus, the driver can perform driving operation (typically, braking operation) for avoiding a collision against the intersecting approaching target before the vehicle control is started (executed), which results in making it possible to prevent unnecessary actuation of the vehicle control. Note that TTC is a period predicted to be required for the own vehicle to collide against the target and can be computed by dividing a "relative distance from the own vehicle to the target" by a "relative speed of the target with respect to the own vehicle".

More detailed description will be provided below. First, the ECU 10 detects an intersecting approaching target based on the surrounding information. Specifically, the ECU 10 computes a traveling direction of the target based on temporal transition of a relative position of the target detected based on the surrounding information. Then, the ECU 10 determines whether the target "is traveling from a direction intersecting the traveling direction of the own vehicle so as to approach the course of the own vehicle" based on the relative position and the traveling direction of the target. When a positive determination result is obtained, the ECU 10 determines that the target is a "candidate for the intersecting approaching target". When the positive determination result is obtained consecutively over a plurality of cycles, the ECU 10 detects the target as the intersecting approaching target. This increases detection accuracy of the intersecting approaching target. When the target is detected as the intersecting approaching target once, the ECU 10 recognizes the target as the intersecting approaching target without performing the determination for the target thereafter. The ECU 10 acquires information including the relative position of the intersecting approaching target among the surrounding information as intersecting approaching target information. The intersecting approaching target information corresponds to one example of "first information".

Then, the ECU 10 determines whether there is a possibility of a collision against the detected intersecting approaching target. Specifically, the ECU 10 computes each of a trajectory of the own vehicle and a trajectory of the intersecting approaching target. The trajectory of the own vehicle can be computed based on a turning radius of the own vehicle. The turning radius can be computed based on the vehicle speed and the yaw rate included in the vehicle state information. The trajectory of the intersecting approaching target can be computed based on a temporal transition of an "absolute position (bearing and distance) computed from the relative position of the intersecting approaching target included in the intersecting approaching target information". The trajectory of the intersecting approaching target is typically a speed vector. The ECU 10 determines whether the own vehicle collides against the target when the own vehicle is traveling while maintaining a current traveling state and the intersecting approaching target is moving while maintaining a current moving state based on these trajectories. When a positive determination result is obtained, the ECU 10 determines that there is a possibility of a collision against the intersecting approaching target.

Figures 2, 3:
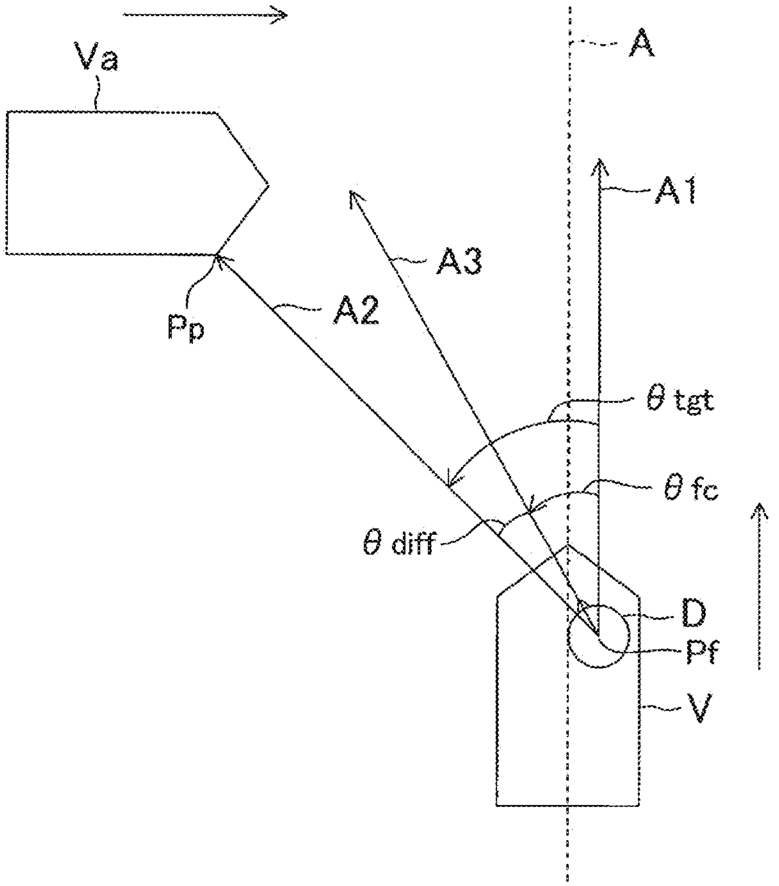
FIG. 2 is a view for explaining a target angle, a face angle and a difference angle.
FIG. 3 is a map that specifies a relationship between the difference angle and a delay period.

When it is determined that there is a possibility of a collision, the ECU 10 computes the variable threshold TTCthv for the intersecting approaching target. Specific description will be provided with reference to FIG. 2 and FIG. 3. FIG. 2 illustrates a scene in which an own vehicle V and an intersecting approaching target Va are traveling at respective predetermined vehicle speeds. It is determined that there is a possibility of a collision against the intersecting approaching target Va. In this case, the ECU 10 computes a target angle θtgt based on the vehicle state information and the intersecting approaching target information and acquires a face angle θfc of a driver D from the driver information.

The target angle θtgt is specified as an angle formed by a "direction from the own vehicle V toward the intersecting approaching target Va" based on the "traveling direction of the own vehicle V". The target angle θtgt is computed as a positive value when the target is located on a left side with respect to the traveling direction of the own vehicle V and is computed as a negative value when the target is located on a right side. In the example in FIG. 2, an arrow A1 extending from a predetermined position Pf of the face of the driver D (specifically, substantially the center of the face in planar view) in parallel to an anterior-posterior axis A of the own vehicle V represents the "traveling direction of the own vehicle V". Further, an arrow A2 from the position Pf toward a position Pp of the intersecting approaching target Va represents the "direction from the own vehicle V toward the intersecting approaching target Va". In other words, in the present embodiment, the position Pf is used as the position of the own vehicle V, and the position Pp is used as the position of the target Va. The position Pp can be set at a position of the target Va, to which a distance from the own vehicle V is the shortest. The target angle θtgt can be computed based on a unit speed vector of the own vehicle V computed based on the vehicle state information and a unit vector of the arrow A2 computed based on the intersecting approaching target information.

The face angle θfc is specified as an angle formed by a "direction of the face of the driver D" based on the "traveling direction of the own vehicle V". In the example in FIG. 2, an arrow A3 extending from the position Pf to the direction of the face of the driver D represents the "direction of the face of the driver D". The ECU 10 acquires a value of the face angle acquired from the driver monitoring system 40 as the face angle θfc. The face angle θfc is computed as a positive value when the face is directed toward the left side with respect to the traveling direction of the own vehicle V and is computed as a negative value when the face is directed toward the right side.

Subsequently, the ECU 10 computes a magnitude of a difference between the target angle θtgt and the face angle θfc as a difference angle θdiff (θdiff=|θtgt−θfc|). Then, the ECU 10 reads out a delay period Δt corresponding to a value of the computed θdiff with reference to the map indicated in FIG. 3. The map specifies a relationship between the difference angle θdiff and the delay period Δt and is stored in advance in the ROM of the ECU 10.

As indicated in FIG. 3, the difference angle θdiff has n values θk (k is an integer from 1 to n) set in advance. θ1=0, and θk<θk+1 is established. θn can be set based on an upper limit value of the target angle θtgt and an upper limit value of the face angle θfc. These upper limit values can be determined based on an experiment or a simulation. A value of θk+1−θk may be fixed or may change in accordance with a value of k. On the other hand, the delay period Δt has n values tk (k is an integer from 1 to n) set in advance. tn≥0, and tk>tk+1 is established. A value of tk can be determined based on an experiment or a simulation. A value of tk+1−tk may be fixed or may change in accordance with the value of k. θk corresponds to tk. When a value of the difference angle θdiff satisfies θk≤θdiff<θk+1, tk is read out as the delay period Δt corresponding to the difference angle θdiff.

When the delay period Δt is read out, the ECU 10 determines whether the collision condition is established for the intersecting approaching target for which it is determined that there is a possibility of a collision. When the target is the intersecting approaching target, the ECU 10 determines whether TTC≤TTCthv is established using TTCthv which is a variable value instead of using TTCth which is a fixed value and determines that the collision condition is established when a positive determination result is obtained. In this case, the ECU 10 executes vehicle control. This reduces a possibility of a collision against the intersecting approaching target.

TTCthv can be computed by subtracting the delay period Δt from TTCth. In other words, TTCthv decreases as the delay period Δt increases. In other words, establishment of the collision condition becomes more difficult as the delay period Δt increases. This configuration makes it more difficult for the vehicle control to be executed as the delay period Δt increases.

Specific Actuation

Figure 4:
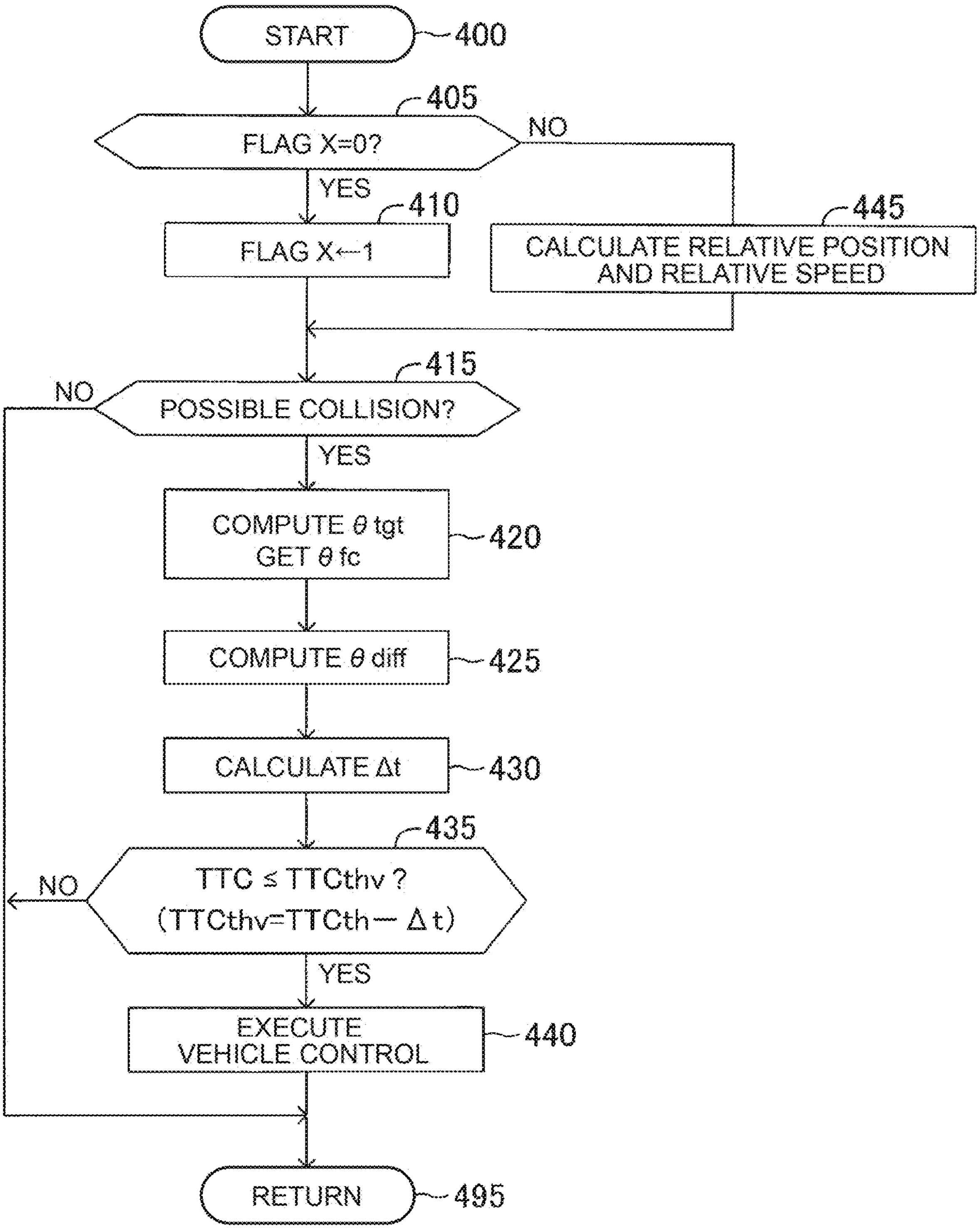
FIG. 4 is a flowchart indicating a routine to be executed by a CPU of a vehicle-control ECU.

Subsequently, specific actuation of the ECU 10 will be described. The CPU of the ECU 10 executes the routine indicated in the flowchart in FIG. 4 while the intersecting approaching target information is acquired. At a predetermined timing, the process proceeds from step 400 to step 405, and the CPU determines whether a value of a flag X of the intersecting approaching target (when there are a plurality of intersecting approaching targets, each intersecting approaching target) included in the intersecting approaching target information is zero. The flag X is a flag for discriminating whether the intersecting approaching target is a newly detected target. When the intersecting approaching target is newly detected in a present cycle, the value of the flag X is set to zero. When the intersecting approaching target has already been detected in the past cycles, the value of the flag X is set to 1. When the flag X is 0 (S405: Yes), the process proceeds to step 410 and the CPU sets the value of the flag X to 1.

Then, the process proceeds to step 415, and the CPU determines whether there is a possibility of a collision using the method described above. When it is determined that there is a possibility of a collision (S415: Yes), the CPU sequentially executes the following processing from step 420 to step 430.

Step 420: compute the target angle θtgt based on the vehicle state information and the intersecting approaching target information and acquire the face angle θfc of the driver D from the driver information (see FIG. 2)

Step 425: compute the difference angle θdiff (=|θtgt−θfc|) using the target angle θtgt computed in step 420 and the acquired face angle θfc (see FIG. 2)

Step 430: read out delay period Δt corresponding to the difference angle θdiff computed in step 425 with reference to the map (see FIG. 3)

Subsequently, the process proceeds to step 435, and the CPU determines whether TTC≤TTCthv is established. TTCthv is a value obtained by subtracting the delay period Δt read out in step 430 from TTCth which is a predetermined fixed value. When TTC≤TTCthv is established (S435: Yes), the CPU determines that the collision condition is established, the process proceeds to step 440, and the CPU executes vehicle control. Then, the process proceeds to step 495, and the CPU ends the present routine once.

On the other hand, when it is determined in step 415 that there is no possibility of a collision (S415: No), and it is determined in step 435 that TTC>TTCthv (S435: No), the process proceeds to step 495, and the CPU ends the present routine once.

In contrast, when the flag X=1 in step 405 (S405: No), the process proceeds to step 445, and the CPU computes (updates) the relative position and the relative speed of the intersecting approaching target based on the intersecting approaching target information. Then, the process proceeds to step 415, and the CPU performs the processing described above and executes vehicle control when the collision condition is established during the process of the processing.

Operational effects of the present device will be described. The present device makes it more difficult for the collision condition to be established (in other words, delays the start timing of the vehicle control) as the difference angle θdiff between the target angle θtgt and the face angle θfc decreases. The "difference angle θdiff decreases" means that the "driver turns his/her face in a direction in which the intersecting approaching target is present". This means that a possibility that the driver recognizes the intersecting approaching target becomes higher. According to this configuration, the start timing of the vehicle control becomes later as the possibility that the driver has recognized the intersecting approaching target becomes higher, so that it is possible to appropriately prevent unnecessary actuation of the vehicle control with respect to the intersecting approaching target.

While the vehicle control device, the vehicle control method, and the vehicle control program according to the embodiment have been described above, the present disclosure is not limited to the embodiment, and various changes can be made without deviating from the object of the present disclosure.

Further, the present disclosure can be also applied to a vehicle capable of executing autonomous driving control.

What is claimed is:

1. A vehicle control device comprising:

a first sensor configured to
- detect information on a region extending from a left front side of a vehicle to a right front side of the vehicle and including a front side of the vehicle,
- detect a target in the region based on the information on the region, and
- calculate relative positions of the target with respect to the vehicle at predetermined intervals based on the information on the region;

a second sensor configured to detect information on a state of the vehicle including a steering angle of the vehicle, a speed of the vehicle, and a yaw rate of the vehicle;

a camera configured to capture an image of a face of a driver in the vehicle; and a control unit configured to
- acquire the information on the region from the first sensor,
- acquire the information on the state of the vehicle from the second sensor,
- acquire the relative positions from the first sensor,
- calculate a first direction that the target travels based on the relative positions,
- determine whether the first direction intersects a second direction that the vehicle travels and whether the target approaches a course that the vehicle travels,
- determine the target as an intersecting approaching target in a case where the control unit determines, multiple times, that the first direction intersects the second direction and the target approaches the course,
- calculate a third direction from the vehicle toward the intersecting approaching target based on the information on the region and the information on the state of the vehicle,
- acquire information including a fourth direction of the face of the driver in the vehicle from the camera,
- calculate a difference between the third direction and the fourth direction, calculate a threshold based on the difference, the threshold decreasing as the difference increases, predict time to collision that is a period until the vehicle collides with the intersecting approaching target, determine whether the time to collision is equal to or less than the threshold, and apply braking force to the vehicle in a case where the control unit determines that the time to collision is equal to or less than the threshold.

2. The vehicle control device according to claim 1, wherein the control unit is further configured to:

calculate absolute positions of the target corresponding to the respective relative positions based on the relative positions;

calculate the first direction based on the absolute positions;

calculate a turning radius of the vehicle based on the speed and the yaw rate; and calculate the second direction based on the turning radius.

3. The vehicle control device according to claim 1, wherein the first direction corresponds to a direction of a speed vector of the target.

4. A vehicle control method comprising:

detecting information on a region extending from a left front side of a vehicle to a right front side of the vehicle and including a front side of the vehicle;

detecting a target in the region based on the information on the region;

calculating relative positions of the target with respect to the vehicle at predetermined intervals based on the information on the region;

detecting information on a state of the vehicle including a steering angle of the vehicle, a speed of the vehicle, and a yaw rate of the vehicle;

capturing an image of a face of a driver in the vehicle;

acquiring the detected information on the region;

acquiring the detected information on the state of the vehicle;

acquiring the calculated relative positions detected;

calculating a first direction that the target travels based on the relative positions;

determining whether the first direction intersects a second direction that the vehicle travels and whether the target approaches a course that the vehicle travels;

determining the target as an intersecting approaching target in response to a plurality of the determinations that the first direction intersects the second direction and the target approaches the course;

calculating a third direction from the vehicle toward the intersecting approaching target based on the information on the region and the information on the state of the vehicle;

acquiring information including a fourth direction of the face of the driver in the vehicle based on the captured image;

calculating a difference between the third direction and the fourth direction;

calculating a threshold based on the difference, the threshold decreasing as the difference increases;

predicting time to collision that is a period until the vehicle collides with the intersecting approaching target;

determining whether the time to collision is equal to or less than the threshold; and applying braking force to the vehicle in response to the determination that the time to collision is equal to or less than the threshold.

5. A non-transitory storage medium storing a vehicle control program causing a computer to execute:

detecting information on a region extending from a left front side of a vehicle to a right front side of the vehicle and including a front side of the vehicle;

detecting a target in the region based on the information on the region;

calculating relative positions of the target with respect to the vehicle at predetermined intervals based on the information on the region;

detecting information on a state of the vehicle including a steering angle of the vehicle, a speed of the vehicle, and a yaw rate of the vehicle;

capturing an image of a face of a driver in the vehicle;

acquiring the detected information on the region;

acquiring the detected information on the state of the vehicle;

acquiring the calculated relative positions detected;

calculating a first direction that the target travels based on the relative positions;

determining whether the first direction intersects a second direction that the vehicle travels and whether the target approaches a course that the vehicle travels;

determining the target as an intersecting approaching target in response to a plurality of the determinations that the first direction intersects the second direction and the target approaches the course;

calculating a third direction from the vehicle toward the intersecting approaching target based on the information on the region and the information on the state of the vehicle;

acquiring information including a fourth direction of the face of the driver based on the captured image;

calculating a difference between the third direction and the fourth direction;

calculating a threshold based on the difference, the threshold decreasing as the difference increases;

predicting time to collision that is a period until the vehicle collides with the intersecting approaching target;

determining whether the time to collision is equal to or less than the threshold; and applying braking force to the vehicle in response to the determination that the time to collision is equal to or less than the threshold.

* * * * *